March 9, 1954     J. I. GREENBERGER     2,671,274

INDEXING MECHANISM

Filed Dec. 4, 1951

INVENTOR.
JOSEPH I. GREENBERGER
BY Joseph E. Dickinson

HIS ATTORNEY

Patented Mar. 9, 1954

2,671,274

UNITED STATES PATENT OFFICE 2,671,274

INDEXING MECHANISM

Joseph I. Greenberger, Pittsburgh, Pa., assignor to United Engineering and Foundry Company, Pittsburgh, Pa., a corporation of Pennsylvania Application December 4, 1951, Serial No. 259,824

5 Claims. (Cl. 33—181)

This invention relates to an indexing mechanism and, in particular, to a mechanism adapted to be attached to the end of a rotatable horizontally disposed workpiece such as a shaft, rolling mill roll or the like for determining accurately the desired spacing to be effected where certain machining operations such as the milling of slots or splines are to be performed upon the workpiece by the machining apparatus upon which it is mounted.

The usual types of indexing mechanisms employed either are quite complicated and therefore subject to being thrown out of alignment and adjustment very easily or they are quite cumbersome to use. All of the known types of indexing mechanisms depend upon their being accurately mounted axially with respect to the axial center of rotation of the workpiece in order that the workpiece indexing operation be performed accurately. Considerable time, therefore, is necessary in order that known types of indexing mechanisms can be accurately applied to the workpiece and the indexing operation completed.

With respect to the indexing mechanism herein disclosed, it is one of the objects thereof to provide a mechanism which may be readily attached to the workpiece to be indexed without regard to the location of the center of rotation thereof relative to the center of rotation of the workpiece to be indexed.

Another object of this invention is to provide an indexing mechanism which is simple and rugged of construction and yet which is accurate and consistent in its functions.

Still another object of this invention is to provide an indexing mechanism which is relatively simple in its operation thereby being adapted to be used by one other than a skilled mechanic. These objects, as well as the various other novel features and advantages of this invention, will be apparent from the following description and accompanying drawings of which:

Figure 3:
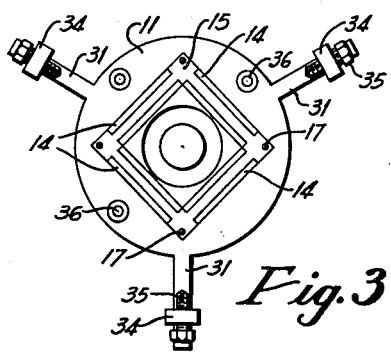
Figure 3 is a view of the under side of the base of the indexing mechanism.

With reference to the figures, the indexing mechanism disclosed herein comprises a base 11, a plate 12 rotatably secured thereto and an indexing indicator 13 rotatably secured to the plate 12. To the base 11 four permanent magnets 14, Figure 3, are secured by means of a non-magnetic frame 15 made of aluminum or the like which is secured in groove 16 of the base by means of fasteners 17. The plate 12 is provided with a series of openings indexed from 0° to 345°, in 15° increments, which are located on a circle described about the center of rotation of the indicator. The plate 12 is provided with a wing 18 having an arcuate slotted opening 19 therein and through which passes a stud 21 which is threadably secured to the base 11 and having at its outer end a knurled nut 22 which may be drawn up tightly for locking together the base 11 and the plate 12. The slot 19, when the nut 22 is loosened, permits the plate 12 to be rotated to a limited extent relative to the base for reasons to be hereinafter set forth.

The indicator 13 is provided with a pointer 23 and with a pull pin 24 attached adjacent thereto having a spring 25 confined within a chamber 26 for urging the pin 24 toward the plate 12. The pin is of such a size that the end thereof may be engaged with any one of the openings indexed 0° through 345° of the plate 12.

Mounted upon a projection 27 secured to the indicator 13 there is a precision spirit level 28 which is secured at its ends to the projection by means of a pin 29 and a bolt and nut 30. The level is so mounted with respect to the indicator 13 that a plane passing axially therethrough perpendicular to the indicator 13 will pass through the center of rotation of the indicator and will be at right angles to a plane perpendicular to the indicator 13 and passed through the center of the pull pin 24 and the center of rotation of the indicator.

Figure 1:
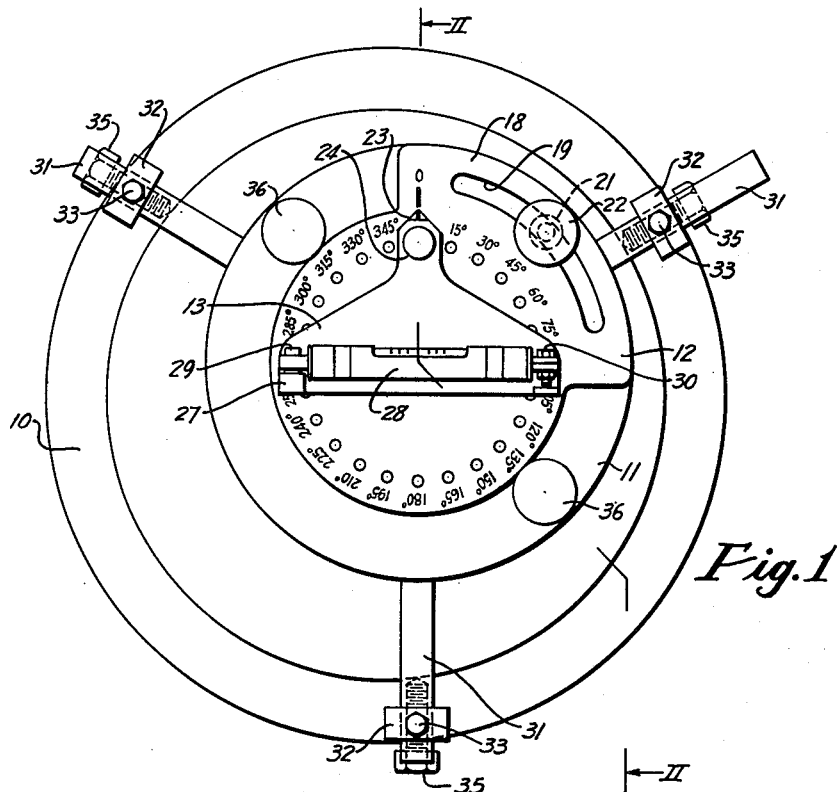
Figure 1 is an end view of the indexing mechanism embodying the invention herein disclosed as applied to the end of a shaft or rolling mill roll upon which machining operations are to be performed.
Figure 2:
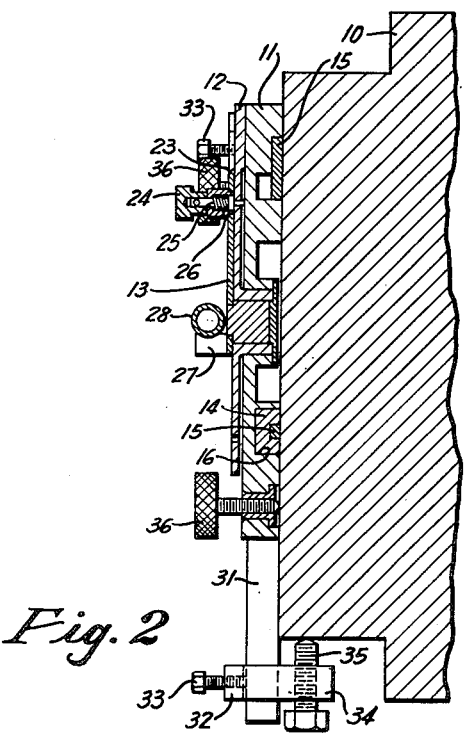
Figure 2 is a stepped sectional view taken at II—II of Figure 1.

While the permanent magnets 14 mounted on the under side of the base are sufficient for securing the indicating mechanism to a ferrous workpiece such as a shaft or rolling mill roll 10, shown in Figures 1 and 2, additional means are provided for insuring that the indexing mechanism will not shift from its pre-set position on the end of the shaft or roll. Then, too, such means are provided for positively securing the indexing mechanism to a non-ferrous or non-metallic workpiece requiring indexing. Such means include arms 31 integral with the base 11, spaced 120° apart, and extending radially outward from the base. Slidable along each of the arms there is a collar 32 having a set screw 33 for securing it to the arm. Each of the collars is provided with an extension 34 on the side opposite to that to which the set screw is applied and through which a locking set screw 35 is passed for positively securing the indexing mechanism to the workpiece. When the mechanism is to be removed from the workpiece on completion of the indexing operation, two knurled set screws 36 spaced diametrically apart and threadably engaged with the base 11 are adapted to be drawn up for forceably pressing their inner ends against the workpiece in order to overcome the attraction between the magnets and the workpiece.

Although this mechanism may be employed for indexing various types of workpieces, the application thereof to a shaft or rolling mill roll 10 is briefly set out as follows:

As shown in Figure 1, by means of magnets 14 and adjustable collars 32 on the arms 31 and set screws 35 the indexing mechanism is attached to the end of a shaft or roll 10, and may be placed thereon in any position without regard to the location of the center of rotation of the mechanism with respect to location of the axis of the roll. Prior to attaching the mechanism to the roll the pull pin 24 is preferably inserted in the 0° opening of the plate 12 and the indexing pointer placed approximately vertical. The knurled nut 22 is then loosened and the plate 12 and indicator 13 are rotated as a unit relative to the base 11 until the bubble of the spirit level is in the center of the level thereby indicating that the pointer 23 is vertical. The knurled nut 22 is then drawn up tight to prevent further rotation of the plate 12 and indicator 13 relative to the base 11. It is assumed that prior to the attachment of the indexing mechanism the shaft or roll was placed in the machine in the position desired at which the first machining operation was to be performed. As soon as the first machining operation has been completed, the operator determines the next position on the shaft or roll upon which the next machining operation is to be performed and by withdrawing the pull pin 24 from its engagement with the 0° opening rotates the indicator 13 clockwise and engages the pull pin with the proper opening which indicates the degree of spacing between the second machining operation and the first. It is assumed, for example, that the second operation is to be performed 45° away from the first and such being the case the pull pin is inserted in the opening opposite the 45° marking. The shaft or roll 10 is then rotated in the machine upon which it is mounted in a counter-clockwise direction until the bubble of the spirit level is again in the center thus indicating that the pointer 23 is again vertical. This position then is the position at which the second machining operation is to be performed and is 45° away from the first. While the indexing openings have been indicated as being 15° apart it is to be appreciated that any number and relative spacing of the openings may be provided as this device is adapted to be used accurately for indicating any spacing or between machining operations.

As soon as the machining operations have been performed and it is desired to remove the indexing mechanism from the end of the shaft or roll, the set screws 35 are loosened to free the arms from the workpiece and the set screws 36 are tightened in order to forceably oppose and overcome the attraction between the magnets 14 and the workpiece.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. An indexing mechanism adapted to be secured to and for indexing a horizontally disposed rotatable ferrous workpiece upon which spaced machining operations are to be performed comprising a base, permanent magnets affixed within the base at the under side thereof for securing said base to a substantially vertical surface of said workpiece, the workpiece contacting surface of said magnets corresponding substantially to the surface of said workpiece at the point of attachment, a plate rotatably secured to said base and provided with a plurality of circumferentially spaced openings therein equidistant from the center of rotation of said plate uniformly angularly displaced relative to one another, releasable locking means permitting limited rotational adjustment of said plate relative to said base, an indicator rotatably secured to and at the center of rotation of said plate, a pin secured to said indicator and releasably engageable with the angularly spaced openings of said member, and a level secured to said indicator for denoting the required displacement of the workpiece from one operational position to the next succeeding one.

2. An indexing mechanism adapted to be secured to a substantially vertical surface of a workpiece upon which spaced machining operations are to be performed comprising a base, locking means including magnetic means for securing said base to said workpiece, a plate rotatably secured to said base and provided with a plurality of circumferentially spaced openings uniformly angularly offset with respect to one another and with an arcuate opening described about a center coinciding with the center of rotation of said plate, releasable locking means secured to said base and extending through said slotted opening engageable with and for permitting limited rotational adjustment of said plate relative to said base, an indicator rotatably secured to and at the center of rotation of said plate, releasable locking means comprising a spring-pressed pull-pin carried by said indicator and engageable with the spaced openings of said plate for preventing relative rotation between said indicator and said plate on moving said indicator from an initial to a new position and a level secured to and at the center of rotation of said indicator for denoting the required displacement of the workpiece from one operational position to the next succeeding one.

3. An indexing mechanism adapted to be secured to and for indexing a horizontally disposed rotatable workpiece upon which spaced machining operations are to be performed comprising a base, integral arms outwardly extending therefrom, adjustable means secured to said arms for securing said base to a substantially vertical surface of said workpiece, additional means comprising a permanent magnet mounted within said base for assisting in securing said base to said workpiece, a plate rotatably secured to said base and provided with a plurality of uniformly angularly spaced openings equidistant from the center of rotation of said plate relative to said base and with an arcuate opening described about a center coinciding with the center of rotation of said plate, a releasable locking means secured to said base and extending through said slot engageable with and for permitting limited rotational adjustment of said plate relative to said base, an indicator rotatably secured to and at the center of rotation of said plate, a pin secured to said indicator and releasably engageable with the spaced openings of said member on moving said indicator from an initial to a new position, and a level secured to the center of said indicator and at right angles to a plane perpendicular to said plate and passing through said pin and the center of rotation of said plate for denoting the required displacement of the workpiece from one operational position to the next succeeding one.

4. An indexing mechanism comprising a base, a member rotatably secured to said base provided with a plurality of openings therein spaced equidistant from the center of rotation of said member and uniformly angularly displaced with respect to one another, releasable locking means between said member and said base permitting limited rotational adjustment of one with respect to the other, an indicator rotatably secured to and at the center of rotation of said member, releasable locking means secured to said indicator and engageable with the spaced openings of said member, a level secured to said indicator, a plurality of magnets secured to the under side of said base for securing said device to a ferrous workpiece and additional means integral with and spaced around said base for clamping said device to said workpiece.

5. An indexing mechanism adapted to be secured to and for indexing a horizontally disposed rotatable workpiece upon which spaced machining operations are to be performed comprising a base, means integral with and for securing said base to a substantially vertical surface of said workpiece, a plate rotatably secured to and adjustable with respect to said base and provided with a plurality of circumferentially uniformly angularly spaced openings therein equidistant from the center of rotation of said plate, releasable locking means permitting limited rotational displacement of said plate relative to said base, an indicator rotatably secured to and at the center of rotation of said plate, locking means secured to said indicator and releasably engageable with the spaced openings of said member on moving said indicator from an initial to a new position, and means secured to said plate for denoting the required displacement of said workpiece from one operational position to the next succeeding one as determined by the new position of said indicator.

JOSEPH I. GREENBERGER.

References Cited in the file of this patent

UNITED STATES PATENTS

| Number | Name | Date |
|---|---|---|
| 1,232,701 | Locke | July 10, 1917 |
| 1,316,244 | Kemble | Sept. 16, 1919 |
| 1,471,285 | Royal | Oct. 16, 1923 |
| 1,514,452 | Frederickson | Nov. 4, 1924 |
| 1,540,319 | Eisele | June 2, 1925 |
| 1,670,349 | Hain | May 22, 1928 |
| 2,090,020 | Ballou | Aug. 17, 1937 |

FOREIGN PATENTS

| Number | Country | Date |
|---|---|---|
| 581,463 | Great Britain | Oct. 14, 1946 |